United States Patent Office 3,428,572
Patented Feb. 18, 1969

3,428,572
METHOD OF CATALYST PREPARATION
Edward Michalko, Chicago, Ill., assignor to Universal Oil Products Company, Des Plaines, Ill., a corporation of Delaware
No Drawing. Filed Apr. 18, 1966, Ser. No. 543,053
U.S. Cl. 252—436　　　　　　　　　　　　　10 Claims
Int. Cl. B01j *11/16*

ABSTRACT OF THE DISCLOSURE

A method of compositing a catalytic component with an inorganic oxide carrier material. A soluble compound of a catalytically active metal and a soluble sulfur-containing compound are admixed with an inorganic oxide hydrosol, the mixture being thereafter treated at conditions effecting gelation of the hydrosol.

---

This invention relates to a novel method for compositing a catalytically active metallic component with an inorganic oxide carrier material. More particularly, this invention relates to a novel method for compositing platinum with an alumina carrier material.

The manufacture of those catalysts comprising a catalytically active metallic component composited with an inorganic oxide carrier material is generally accomplished by a series of process steps. The initial step concerns the preparation of the inorganic oxide carrier material and involves digesting a suitable metal compound in acid solution to form a hydrosol which is subsequently treated to form a hydrogel. The latter is thereafter washed and dried and calcined at an elevated temperature to yield an inorganic oxide carrier material with desired surface area characteristics. A precursor of the catalytically active metallic component, usually a water soluble compound thereof, is then composited with the carrier material by any one of several methods known to the art. In any case, a repetition of the drying and calcining technique is required in order to activate the catalytic component and yield the desired catalyst. It will be appreciated that a considerable savings of time and expense could be accomplished by incorporating the catalytic component precursor in the hydrosol initially prepared so that drying and calcination would not have to be repeated. However, according to present practice this is not practical since the repeated washings to which the hydrogel is subsequently subjected would remove a considerable portion if not all of the catalytic component. This problem is of course considerably aggravated when the catalytically active metallic component is a noble metal such as platinum, the precursor thereof usually being the water soluble chloroplatinic acid or the like.

It is therefore an object of this invention to present a method of compositing a catalytically active metallic component with an inorganic oxide carrier material, which method allows the incorporation of the catalytically active metallic component, or a precursor thereof, in a hydrosol and retention of the same during subsequent processing of the catalyst. As hereinafter employed in the present specification and appended claims, the term "catalytic component" is intended to connote the catalytically active metallic component of the catalyst composite as distinguished from that portion of the catalyst composite referred to as an inorganic oxide whose principle function is as a carrier material or support for the catalytically active metallic component. Also, the term "catalytic component precursor" is intended to connote a soluble compound of the catalytically active metallic component, said precursor being initially incorporated in the hydrosol and subsequently converted to the catalytically active metallic component by oxidation, reduction, decomposition or other suitable technique.

In one of its broad aspects, the present invention embodies a method of compositing a catalytic component with an inorganic oxide carrier material and comprises admixing a soluble compound of a catalytically active metal and a soluble sulfur-containing compound with an inorganic oxide hydrosol and treating the resulting mixture at conditions effecting gelation of the hydrosol, the aforesaid sulfur-containing compound being selected from the group consisting of carbothiolic acids, carbothionic acids, carbodithionic acids, mercaptocarboxylic acids and thioamides.

One of the more specific embodiments relates to a method of compositing platinum with alumina, which method comprises admixing chloroplatinic acid, mercaptosuccinic acid and hexamethylenetetraamine with an alumina hydrosol and heating the resulting mixture at a temperature of from about 120° F. to about 220° F., the aforesaid chloroplatinic acid and mercapto-succinic acid being used in a mole ratio of from about 1 to 1 to about 1 to 10.

Other objects and embodiments of this invention will become apparent in the following detailed specification.

The method of this invention is advantageously employed to incorporate any of the catalytically active metals or their precursors in an inorgic oxide carrier material. Because of the value attached to the platinum group metals and their precursors, little if any loss can be afforded in the manufacturing process. The method of the present invention is therefore particularly applicable to the preparation of platinum group metal catalysts composited with an inorganic oxide carrier material. The platinum group metal, i.e., ruthenium, rhodium, palladium, osmium, iridium and platinum, is admixed with the inorganic oxide hydrosol in the form of a precursor of the selected metal, for example, chloroplatinic acid, chloropalladic acid, ammonium chloroplatinate, platinous chloride, platinic chloride, ruthenium tetrachloride, rhodium trichloride, rhodium nitrate, osmium trichloride, iridium dichloride, iridium sulfate, and the like, which is soluble in the hydrosol. In view of the cost involved, the platinum group metal component of catalysts such as herein contemplated is generally maintained at from about .01 to about 1.0 wt. percent of the final catalyst composite although larger amounts can be employed. In any case, in accordance with the method of this invention, the catalytically active metal precursor can be admixed with the hydrosol in an amount to yield a final catalyst comprising the catalytically active metal in the desired concentration with the assurance that little if any loss will occur in the subsequent process steps leading to the recovery of the final catalyst composite.

The catalytic component precursor is fixed in the hydrosol by the inclusion therein of a sulfur-containing compound which can be a carbothiolic acid, carbothionic acid, carbodithionic acid, mercaptocarboxylic acid or a thioamide which is soluble in said hydrosol. Suitable sulfur-containing compounds thus include methanethiolic acid, ethanethiolic acid, propanethiolic acid, methanethionic acid, ethanethionic acid, propanethionic acid, ethanedithionic acid, propanedithionic acid, mercaptoformic acid, mercaptoacetic acid, mercaptopropionic acid, mercaptovaleric acid, mercaptooxalic acid, mercaptomalonic acid, mercaptosuccinic acid, mercaptolactic acid, mercaptosalicylic acid, thioformamide, thioacetamide, thiopropionamide and the like. In particular, mercaptoacetic acid and mercaptosuccinic acid, and also thioacetamide have been found to be particularly effective in the preparation of platinum group metal catalysts. The selected sulfur-containing compound can be admixed with the hydrosol either prior to or subsequent to the addition of the catalytic component precursor but before gelation of the hydrosol occurs. For optimum results the sulfur-containing compound should be included in the hydrosol in at least about an equimolar amount with the catalytic component, but the sulfur-containing compound can be used in a molar excess of as much as 10 to 1 or more.

The inorganic oxide carrier materials herein contemplated are the synthetically prepared inorganic oxides including silica, alumina, zirconia, thoria, boria, and the like, and also composites thereof such as silica-alumina, zirconia-alumina, etc., the manufacture of which includes digesting a suitable metal or inorganic compound thereof in acid solution and formation of a hydrosol preliminary to gelation of the same and subsequent washing, drying and calcining to form the desired inorganic oxide carrier material. One preferred application of the method of this invention relates to compositing a catalytically active metallic component with an alumina carrier material. The alumina hydrosol can be prepared by any conventional or otherwise convenient method. Generally, an alumina hydrosol is formed on heating aluminum metal with an acidic reagent such as hydrochloric acid and/or aqueous aluminum chloride at about the boiling point of the mixture—usually at a temperature of from about 175° F. to about 220° F. When it is desired to employ a composite of alumina and silica as the inorganic oxide carrier material, the catalytic component precursor and the sulfur-containing compound can be admixed with a common hydrosol of alumina and silica and the desired silica-alumina composite prepared by cogelation. Alternatively, the catalytic component precursor and the sulfur-containing compound can be included in an alumina hydrosol as first mentioned and the latter utilized to treat and impregnate a silica hydrogel in the conventional manner, the alumina hydrosol being thereafter converted to the hydrogel to form the desired composite. Conversely, the catalytic component precursor and the sulfur-containing compound can be included in a separately prepared silica hydrosol thereafter converted to the hydrogel and subsequently treated and impregnated with an alumina hydrosol which may or may not contain further quantities of the catalytic component precursor and sulfur-containing compound. In any case, the alumina hydrosol is thereafter converted to the hydrogel to form the desired composite.

Gelation conditions vary with respect to different hydrosols as is well known in the art. For example, while a silica hydrosol will gel merely with time and/or temperature, an alumina hydrosol requires the assistance of a basic precipitating or setting agent. Ammonium hydroxide, ammonium carbonate, etc., are suitable precipitating or setting agents with respect to an alumina hydrosol. The present invention permits the incorporation of a catalytic component precursor in a hydrosol convertible to gel particles of any desired shape or size. The preferred shape is the sphere, the spheres being continuously manufactured by the well known oil drop method. For example, droplets of an alumina hydrosol containing the desired catalytic component precursor and a setting agent are passed into an oil bath maintained at an elevated temperature and retained therein until they set into hydrogel spheroids. The method is described in detail in U.S. Patent No. 2,620,314 issued to James Hoekstra. In this case it is highly desirable to utilize a weak base, preferably urea, hexamethylenetetraamine, and the like, which permits the preparation of a mixture of alumina sol and setting agent which will not set immediately to a gelatinous mass but which will set to a hydrogel within a reasonable time. This time differential permits passing the mixture into the oil bath so that the hydrosol may assume the desired shape during passage therethrough.

The following examples are presented in illustration of the method of this invention and are not intended as a limitation of the generally broad scope of the invention as set out in the appended claims.

EXAMPLE I

Seven hundred and five milliliters of an alumina hydrosol, comprising 12 wt. percent aluminum digested in dilute hydrochloric acid to give an aluminum/chlorine ratio of 1.28, was admixed with 4.05 milliliters of an aqueous chloroplatinic acid solution containing 0.629 grams of platinum per milliliter, or sufficient to give a final catalyst composite containing 0.12 wt. percent platinum. To this mixture was added 11.7 milliliters of an aqueous mercaptosuccinic acid containing 0.05 gram of said acid per milliliter. This amounted to a 3/1 molar ratio of mercaptosuccinic acid to platinum. The foregoing was then blended 705 milliliters of 28 wt. percent hexamethylenetetraamine. The hydrosol thus prepared was formed into spherical hydrogel particles by emitting droplets thereof in an oil suspending medium maintained at about 195° F. The spherical hydrogel particles were then aged in the oil suspending medium for about 70 minutes at 302° F. and at a pressure of 100 p.s.i.g. The aged spheres were recovered and washed with water containing a small amount of ammonium hydroxide. The washed spheres were then partially dried at about 248° F. and immediately calcined at a temperature of about 1200° F. Analysis of the calcined spheres indicated that they comprised about 0.12 wt. percent platinum, a retention of substantially all of the platinum originally included in the hydrosol.

EXAMPLE II

Fourteen hundred milliliters of an alumina hydrosol, comprising 11.96 wt. percent aluminum digested in dilute hydrochloric acid to give an aluminum/chlorine ratio of 1.12, was admixed with 51.3 milliliters of an aqueous chloroplatinic acid solution containing .0614 gram of platinum per milliliter, or sufficient to give a final catalyst composite containing 0.75 wt. percent platinum. To this mixture was added 4.85 grams of thioacetamide dissolved in 50 milliliters of water. The foregoing was then blended with 1350 milliliters of 30 wt. percent hexamethylenetetraamine. The hydrosol thus prepared was formed into spherical hydrogel particles by passing droplets thereof into an oil suspending medium maintained at about 195° F. The spherical hydrogel particles were then aged in the oil suspending medium for 70 minutes at 302° F. under p.s.i.g. pressure. The spheres were thereafter water-washed, dried at about 200–600° F. and calcined in an air atmosphere at 800° F. The catalyst thus prepared contained 0.75 wt. percent platinum.

EXAMPLE III

A silica hydrosol was prepared by the addition of 797 milliliters of a water glass solution (containing 150 gram equivalents of silica) to 266 milliliters of 19 wt. percent hydrochloric acid solution. To this hydrosol was added 39.8 grams of nickel nitrate hexahydrate and 40.8 grams of mercaptosuccinic acid. A preneutralized alum solution was prepared by adding 140 milliliters of 28 wt. percent ammonia solution to 570 milliliters of aluminum sulfate solution (containing 50 gram equivalents of alumina). The above sol systems were pumped into a mixer and discharged with the aid of a vibrator into a forming oil at about 95° C. to form hydrogel spheres. The spheres were oil aged for 4 hours at 95° C. and an additional 4 hours at 95° C. in 5% aqueous ammonia. The spheres were then washed with 2% ammonia solution, dried and calcined. The spheres thus prepared contain 3.85% nickel as originally included in the silica hydrosol.

The catalyst prepared in accordance with the present method may comprise any of the several catalytically active metallic materials, for example, vanadium, chromium, molybdenum, tungsten, iron, nickel, cobalt, the aforementioned platinum group metals, etc., in the oxidized or reduced form. Thus, catalysts prepared in accordance with the method of this invention may be utilized to effect a variety of reactions of organic compounds. These reactions include condensation reactions wherein two like or unlike molecules are combined to form a larger molecule usually with the elimination of water or HCl; decomposition reactions wherein a molecule is broken down into a simpler constituent, or double decomposition wherein two molecules exchange one or more of their constituents; rearrangement reactions as, for example, isomerizations; and disproportionation reactions wherein a radical is transferred from one molecule to another. The catalysts are useful to effect hydrogenation reactions including hydrogenation of unsaturated aliphatic hydrocarbons such as monoolefins, diolefins, etc., to form the corresponding saturated hydrocarbons; hydrogenation of unsaturated cyclic hydrocarbons, unsaturated alcohols, ketones, acids, etc.; and also oxidation reactions, e.g., oxidation of olefins to form the corresponding oxides such as the oxidation of ethylene to form ethylene oxide, etc., oxidation of alcohols, ketones, etc. The catalysts prepared in accordance with the method of this invention are particularly useful in effecting the conversion of hydrocarbons such as, for example, polymerization of olefins, particularly ethylene, propylene, 1-butene, 2-butene, isobutylene and higher boiling olefins; alkylation of isoparaffins with olefins or other alkylating agents including, for example, alkylhalides, etc., and particularly the alkylation of isobutane, isopentane, and/or isohexane with ethylene, propylene, 1-butene, 2-butene, isobutylene, etc., or mixture thereof; alkylation of aromatics with olefins or other alkylating agents, and particularly the alkylation of benzene, toluene, etc., with propylene, butylenes, amylenes, and particularly higher boiling olefins, including nonenes, decenes, undecenes, dodecenes, tridecenes, tetradecenes, pentadecenes, etc. or mixtures thereof; isomerization of paraffins and particularly of n-butane, n-pentane, n-hexane, n-heptane, n-octane, etc., or mixtures thereof, including isomerization of less highly branched chain saturated hydocarbons to more highly branched chain saturated hydocarbons such as the isomerization of 2- or 3-methylpentane to 2,3- and 2,2-dimethylbutane; isomerization of naphthenes, for example, the isomerization of methylcyclopentane to cyclohexane, isomerization of dimethylcyclopentane to methylcyclohexane, etc.; hydrogen transfer reactions; alkyl transfer reaction; transalkylation reactions; reforming of gasolines or naphtha to improve the antiknock characteristics thereof; cracking of oil heavier than gasoline into lower boiling products particularly gasoline, also including cracking under hydrogen pressure; and also other reactions of hydrocarbons and organic compounds.

I claim as my invention:
1. A method of compositing a catalytically active metallic component with an inorganic oxide carrier material which comprises admixing a soluble compound of a catalytically active metal and a soluble sulfur-containing compound with an inorganic oxide hydrosol and treating the resulting mixture at conditions effecting gelation of the hydrosol, the aforesaid sulfur-containing compound being selected from the group consisting of carbothiolic acids, carbothionic acids, carbodithionic acids, mercaptocarboxylic acids and thioamides, and thereafter washing, drying and calcining the resultant gel.
2. The method of claim 1 further characterized in that said sulfur-containing compound is a mercaptocarboxylic acid.
3. The method of claim 1 further characterized in that said sulfur-containing compound is a thioamide.
4. The method of claim 2 further characterized in that said catalytically active metal is a metal of the platinum group.
5. The method of claim 4 further characterized in that said mercaptocarboxylic acid is mercaptosuccinic acid.
6. The method of claim 5 further characterized in that said inoragnic oxide hydrosol is an alumina hydrosol.
7. The method of claim 5 further characterized in that said inorganic oxide hydrosol is a silicia-alumina hydrosol.
8. The method of claim 6 further characterized in that said platinum group metal is platinum.
9. The method of claim 8 further characterized in that said mercaptosuccinic acid and said soluble compound of platinum are utilized in a mole ratio of from about 1 to 1 to about 10 to 1.
10. The method of claim 9 further characterized in that said gelation conditions comprise admixing hexamethylenetetraamine with the alumina hydrosol and heating the same together with the soluble compound of platinum and the mercaptosuccinic acid components at a temperature of from about 120° F. to about 220° F.

References Cited

UNITED STATES PATENTS

| | | | |
|---|---|---|---|
| 2,964,480 | 12/1960 | Schwartz | 252—439 |
| 3,226,447 | 12/1965 | Bing et al. | 252—439 X |
| 3,296,119 | 1/1967 | Bicek | 252—439 X |
| 3,331,787 | 7/1967 | Keith et al. | 252—439 |

DANIEL E. WYMAN, *Primary Examiner.*

C. F. DEES, *Assistant Examiner.*

U.S. Cl. X.R.

252—438, 439, 453, 463